United States Patent
Hackfort et al.

(10) Patent No.: US 9,156,071 B2
(45) Date of Patent: Oct. 13, 2015

(54) ROLL NIP REGULATION DEVICE AND METHOD

(75) Inventors: Thomas Hackfort, Ahaus-Altstuette (DE); Kay Wolters, Stadtlohn (DE); Heinz Wittebrock, Ahaus (DE); Joerg Gottszky, Vreden (DE)

(73) Assignee: SAUERESSIG GMBH + CO. KG, Vreden (DE)

( * ) Notice: Subject to any disclaimer, the term of this patent is extended or adjusted under 35 U.S.C. 154(b) by 58 days.

(21) Appl. No.: 13/261,761

(22) PCT Filed: Apr. 4, 2012

(86) PCT No.: PCT/DE2012/000362
§ 371 (c)(1),
(2), (4) Date: Dec. 23, 2013

(87) PCT Pub. No.: WO2012/146226
PCT Pub. Date: Nov. 1, 2012

(65) Prior Publication Data
US 2014/0109642 A1 Apr. 24, 2014

(30) Foreign Application Priority Data
Apr. 28, 2011 (DE) .......................... 10 2011 018 874

(51) Int. Cl.
*B21B 37/62* (2006.01)
*B21B 31/07* (2006.01)
(Continued)

(52) U.S. Cl.
CPC ................. *B21B 37/62* (2013.01); *B21B 31/07* (2013.01); *B21B 31/02* (2013.01); *B21B 31/028* (2013.01); *B21B 31/04* (2013.01); *B21B 31/32* (2013.01); *B21B 37/38* (2013.01); *B21B 37/64* (2013.01); *H01M 4/0435* (2013.01); *H01M 4/662* (2013.01); *H01M 10/0525* (2013.01)

(58) Field of Classification Search
CPC ...... B21B 37/38; B21B 13/145; B21B 27/00; B21B 27/02; B21B 29/00; B21B 31/07; B21B 31/20; B21B 31/32; B21B 37/62; B21B 37/64; B21B 31/02; B21B 31/028; B21B 31/04; F16C 32/067; H01M 4/043
USPC .................... 72/237, 241.2, 241.8, 244–246
See application file for complete search history.

(56) References Cited

U.S. PATENT DOCUMENTS

| | | |
|---|---|---|
| 3,577,757 A | 5/1971 | Barten |
| 3,877,270 A | 4/1975 | Marten |

(Continued)

FOREIGN PATENT DOCUMENTS

| | | |
|---|---|---|
| CN | 201175719 Y | 1/2009 |
| CN | 101254509 B | 9/2010 |

(Continued)

*Primary Examiner* — Peter DungBa Vo
*Assistant Examiner* — John S Lowe
(74) *Attorney, Agent, or Firm* — Marshall & Melhorn, LLC

(57) ABSTRACT

A compact roll arrangement has a device and method for regulating the roll nip so that intermittently coated films may be calendared precisely. A bearing block is arranged in a bearing jewel, and first lever arms of the clamping latch of the upper roll and the lower roll are connected rigidly to one another. Bearing jewels which lie opposite to one another, of the upper roll and the lower roll are connected to one another via a second actuating element. A controller acts on first and second actuating elements, so that the first actuating elements are moved to adjust the roll nip according to a predetermined thrust and a predetermined linear load, and the second actuating elements are moved to maintain the bearing jewels in a relative rest position which is defined by specified densification of a material web passing the roll nip.

4 Claims, 3 Drawing Sheets

(51) Int. Cl.
  *B21B 37/38* (2006.01)
  *B21B 31/32* (2006.01)
  *B21B 31/02* (2006.01)
  *B21B 31/04* (2006.01)
  *B21B 37/64* (2006.01)
  *H01M 4/04* (2006.01)
  *H01M 4/66* (2006.01)
  *H01M 10/0525* (2010.01)

(56) References Cited

U.S. PATENT DOCUMENTS

| | | | |
|---|---|---|---|
| 4,991,420 A * | 2/1991 | Frischknecht et al. | 72/244 |
| 6,209,377 B1 * | 4/2001 | Shore et al. | 72/248 |
| 6,250,126 B1 | 6/2001 | Yasuda et al. | |
| 6,446,477 B2 | 9/2002 | Yasuda et al. | |
| 7,513,136 B2 | 4/2009 | Laliberte et al. | |
| 2001/0020380 A1 | 9/2001 | Yasuda et al. | |

FOREIGN PATENT DOCUMENTS

| | | |
|---|---|---|
| DE | 1602019 A1 | 3/1970 |
| DE | 2264333 A1 | 7/1974 |
| DE | 19924860 A1 | 12/1999 |
| DE | 19395511 B3 | 9/2004 |
| DE | 10305511 B9 * | 1/2005 |
| JP | 2000079407 A | 3/2000 |
| JP | 2000133251 A | 5/2000 |
| WO | 2004026498 A1 | 4/2004 |

* cited by examiner

ROLL NIP REGULATION DEVICE AND METHOD

BACKGROUND OF THE INVENTION

The invention relates to a roll arrangement having a device for regulating the roll nip, comprising a roll pair which consists of an upper roll and a lower roll, between which a roll nip is formed, wherein each roll is provided with two roll journals which lie axially diametrically opposite one another, at least two bearing blocks for each roll journal, wherein one or more bearings are received in a bearing block, and a bearing block which lies in each case on the outside on the roll journal, in a clamping latch which has a first lever arm and a second lever arm, wherein the second lever arm of the respective clamping latch of the upper roll and the second lever arm of the respective clamping latch of the lower roll are connected to one another via a first actuating element, mutually corresponding bearing jewels and clamping latches of the upper roll and the lower roll lie opposite one another, and a controller which acts on the first and the second actuating element. Further, the invention relates to a method for regulating the roll nip in that roll arrangement. An arrangement of that type and a method of that type are known from CN 101 254 509 A.

It is a long-standing need to provide a roll arrangement having a device for regulating the roll nip, wherein a homogenous thickness of a material web passing the roll nip is guaranteed. This means essentially that the roll nip must be kept constant independent of the existing linear load.

A roll arrangement having one or more pressing devices for keeping the roll nip constant is known from DE 16 02 099 A1. The roll arrangement comprises chocks for respective supporting rolls which the work rolls are abutting which in turn are supported in respective chocks. The chocks for the supporting rolls are compensated by small pressure cylinders providing for the control pressure during the roll process. The roll pressure occurring in the roll arrangement during the roll process is generally substantially higher than the control pressure. By introducing the rolling workpieces into the roll nip, a sudden pressure or a load rise between the rolls results which has as a consequence that the rolling workpiece is thicker when exiting the roll nip than expected with respect to the previous adjustment. In order to compensate for that, the roll nip is adjusted to the desired rolling workpiece thickness by means of a wedge. The wedge absorbs the load, so that the load within the roll nip is constantly zero. It has proven that only a comparatively narrow control range can be controlled by this type of regulation and that moreover now as before undesired impact on the thickness of the rolling workpiece is the result which adversely affects thickness deviations, since only a comparatively slowly reacting regulation is taking place.

For an improvement, DE 22 64 333 C3 proposes to further provide back bending bearings at roll journals with displacement sensors detecting the distance thereof and to provide regulating means acting on the back bending cylinders with a feedback control system to keep superimposed distances constant which are defined by set points and/or supporting forces.

Further, DE 199 24 860 A1 describes a roll arrangement in which the distance between a hydrostatic thrust bearing and a roll can always be maintained, even in a transition state before and after start of rolling, in order to prevent damages of these components caused by a contact between them. Hydrostatic thrust bearings for contact-free support of cylinder section of idle rolls by means of fluid pressure are substantially provided along the horizontal direction, wherein these idle rolls support the work rolls substantially along the horizontal direction. Rolls for keeping the gap constant are provided which prevent that the gaps between the hydrostatic thrust bearing and the idle rolls will become smaller than a predetermined value.

It is known from DE 103 05 511 C3 to arrange inner bearing blocks in bearing jewels on roll journals.

The difficulties arise when the material web falls below a critical value with respect to the calendar size, i.e. when particularly thin materials having a thickness of less than 1 mm having high density and high stiffness must be processed. There is a risk in conventional roll arrangement that, when the calendar passes a thin region or a disruption, the pre-tensioned mechanical elements, such as bearings, bearing seats, rolls, roll journals, fall on each other caused by their spring pre-tensions, and thus local overstress of roll surfaces or the material web will result.

Particular problems are posed in a situation that the material web comprises different thicknesses while passing the roll nip. This can be the case when material webs are intermittently coated, laminated or consist of several layers. One example is coated aluminum or copper films for producing lithium ion batteries. An exact densification must be assured across the entire working width by the micrometer. If this is successful, the contact between the particles within the electrode materials is improved on the one hand, and electron transport is optimized, on the other hand, also the volume power density of the batteries is increased.

The problem of producing electrode materials which are densified by means of rolls is addressed, for example, in JP 2000/133 251 A. A roll pair, where the center distance of the rolls is variable, is exposed to hydraulic cylinders which apply a previously defined pressure in one direction to decrease the distance between rolls. Compensation cylinders for roll bending are provided, and the roll pairs are each shaped that they have, in a center region, a slightly larger diameter than at both ends.

The velocity problem when calendaring material webs of varying thickness is addressed in JP 2000/079 407 A. An upper roll and a lower roll are freely rotatable supported in bearing blocks which are exposed to hydraulic cylinders. These hydraulic cylinders urge the upper roll downwards, the lower roll upwards. Counter bending forces are exerted to independent auxiliary bearings at the respective rolls.

It is the object of the present invention to provide for a compact roll arrangement having a device for regulating the roll nip as well as a corresponding method, so that in particular intermittently coated films may be calendared precisely.

This object is achieved by a roll arrangement of claim 1 and a method of claim 4. Preferred embodiments are subject-matter of respective subclaims referring thereto.

According to the invention, in a roll arrangement of the type mentioned in the introductory, it is provided that the bearing block which lies in each case on the inside on the roll journal is arranged in a bearing jewel and the first lever arm of the clamping latch of the upper roll and the first lever arm of the clamping latch of the lower roll are connected rigidly to one another, and bearing jewels which lie opposite to one another, of the upper roll and the lower roll are connected to one another via the second actuating element. A controller is provided acting on the first actuating elements and the second actuating elements, so that the first actuating elements are moved to adjust the roll nip according to a predetermined thrust and a predetermined linear load, and the second actuating elements are moved to maintain the bearing jewels in a relative rest position which is defined by specified densification of a material web passing the roll nip.

Thus, the roll nip is initially adjusted according to the required thrust and the required linear load. This is achieved in that the clamping latches are respectively adjusted by means of an actuating element. Simultaneously, however, the bearing jewels rest with the bearings on the journals on the first actuating elements which, for example, dependent on the information from a position sensor keep the bearing jewels in a rest position relatively to another. The distance of the bearing jewels is adjusted until the required densification of the material web is achieved.

By applying the loads to the individual introduction points, the bearing shells of rolling elements are pushed free of play and are internally pre-tensioned across the entire hole bearing. In addition, the roles deform spring elastically. This depends on the construction mainly in the transitions from the journals to the barrel and in the barrel itself in a negligible amount, since these are adequately selected according to their diameter.

According to an advantageous embodiment, the first actuating element and/or the second actuating element are embodied as a hydraulically operating actuating element, a pneumatically operating element, or as a mechanically operating element which is electrically driven. The required load may, for example, be introduced via a hydraulic or pneumatic cylinder or via a spindle mechanism. The construction is embodied so that the clamping latches introduce the load into the journal according to the principal of the lever. The clamping latches, the bearing jewels and the roll journals, respectively, are associated with a position sensor system which, by means of a program and corresponding drives, such as hydraulic cylinders or electric linear gearings, recognizes the position of the roll journals and keeps it constant.

When the power rise in the roll nip is changed by different material thicknesses within the material web, in particular caused by an intermittently formed coating, the first actuating elements of the bearing jewels are moved upwards. This is achieved in that the role bending caused by the previously increased line load is now maintained by the introduced equivalent load. Regulation is performed so that a vibrational response will not occur since the roll pair remains in a deformed state. Rolls bend caused by process forces in the roll nip. Edge forces applied to the bearing produced thereby significantly reduce the lifetime thereof.

Consequently, it is advantageous that a bearing block comprises a pivoted bearing housing in which the bearings accommodated therein are arranged pivotally about a common axis. Accordingly, the bearing is freed corresponding to the load direction in the decrease of freedom by spherical receptacles so that no excessive load occurs. The total bearing depends on the tilting motion caused by roll bending, production of undesired edge forces acting on the bearing blocks is avoided.

Moreover, it is provided that the bearing bias is always maintained in the same direction, so that hopping of the bearing elasticity is avoided.

BRIEF DESCRIPTION OF THE DRAWINGS

The invention will be explained in detail below with the aid of the appended drawing.

DETAILED DESCRIPTION OF THE INVENTION

Figure 1:
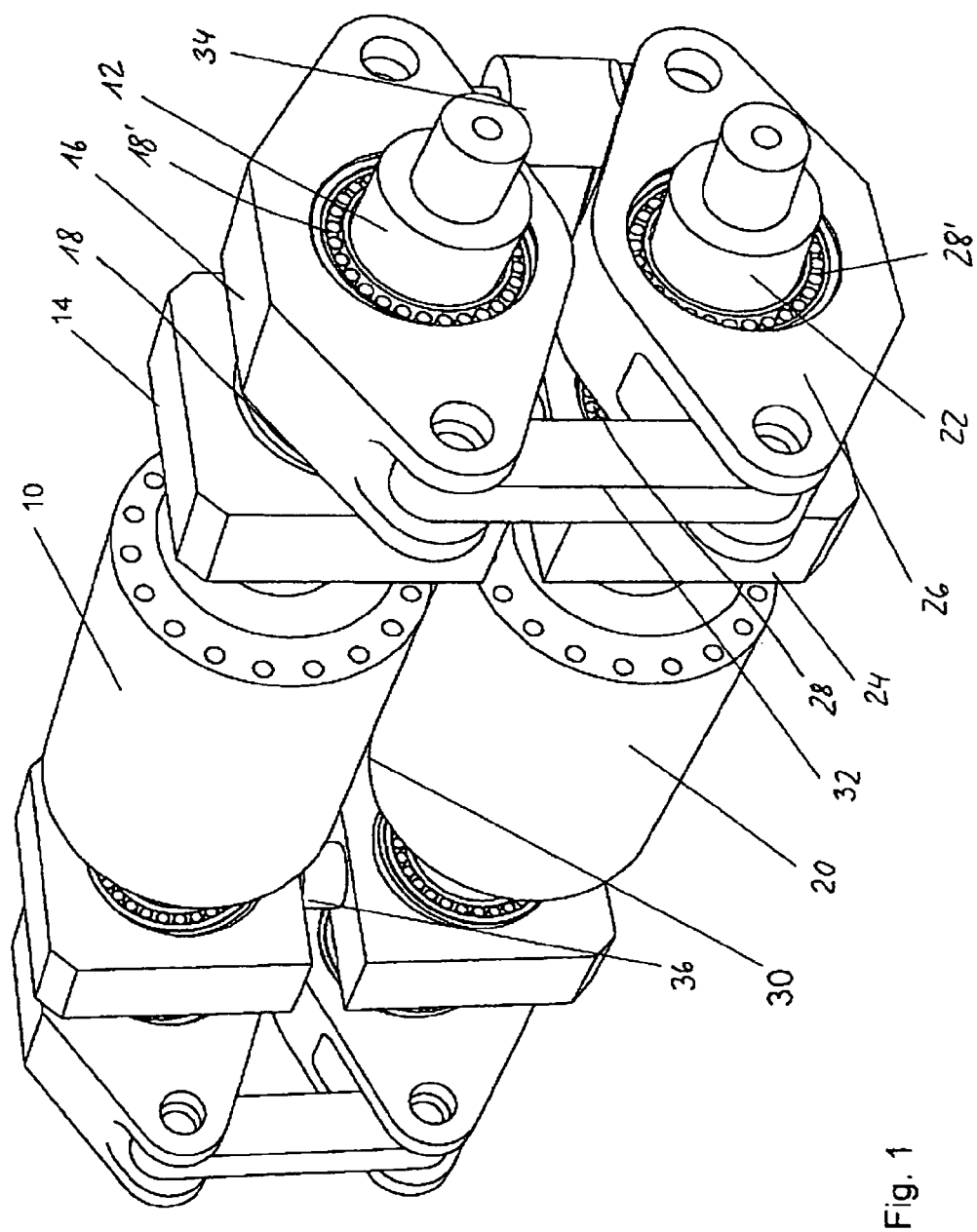
FIG. 1 shows a perspective view of a roll arrangement having a device for regulating the roll nip according to an embodiment of the invention.

FIG. 1 shows a perspective view of a roll arrangement having a device for regulating the roll nip according to an embodiment of the present invention. The roll arrangement is symmetrical with reference to a plane which runs perpendicular to the axis of the upper roll 10 and the lower roll 20 so that essentially only that portion of the role arrangement will be described which, starting from this plane, faces the viewer. Arrangement and configuration of the components on the side facing away from the viewer is accordingly chosen and is, due to the mirror-inverted embodiment, not discussed thoroughly in order to avoid repetitions.

The roll arrangement of FIG. 1 comprises a roll consisting of an upper roll and a lower roll 20, wherein a roll nip is formed therebetween. Upper roll 10 comprises two axially diametrically opposed roll journals 12 which are respectively received within two bearing blocks 18, 18' which will be further described in connection with FIG. 2. The inner bearing block 18 which is closer to upper roll 10 is arranged within a bearing jewel 14, the bearing block 18', mounted farther outboard, in a clamping latch 16. Fully in accordance therewith, lower roll 20 includes two diametrically opposed roll journals 22 which are received in two bearing blocks 28, 28'. Bearing block 28 resting inwardly on roll journal 22 is arranged in a bearing jewel 24, and bearing block 28' positioned outwardly on roll journal 22 is arranged in a clamping latch 26. In the roll arrangement, now, corresponding bearing jewels 14, 24 and clamping latches 16, 26 of upper roll 10 and lower roll 20 are opposed one another. Clamping latch 16 of upper roll 10 is rigidly connected to the clamping latch 26 of lower roll 20 via a tension rod 32 on the one hand and via a first actuating element 34 on the other hand, the function of this coupling being explained in detail in connection with FIG. 3. Opposing bearing jewels 14, 24 of upper roll and lower roll 20 are connected to another via a second actuating element 36.

Figure 2:
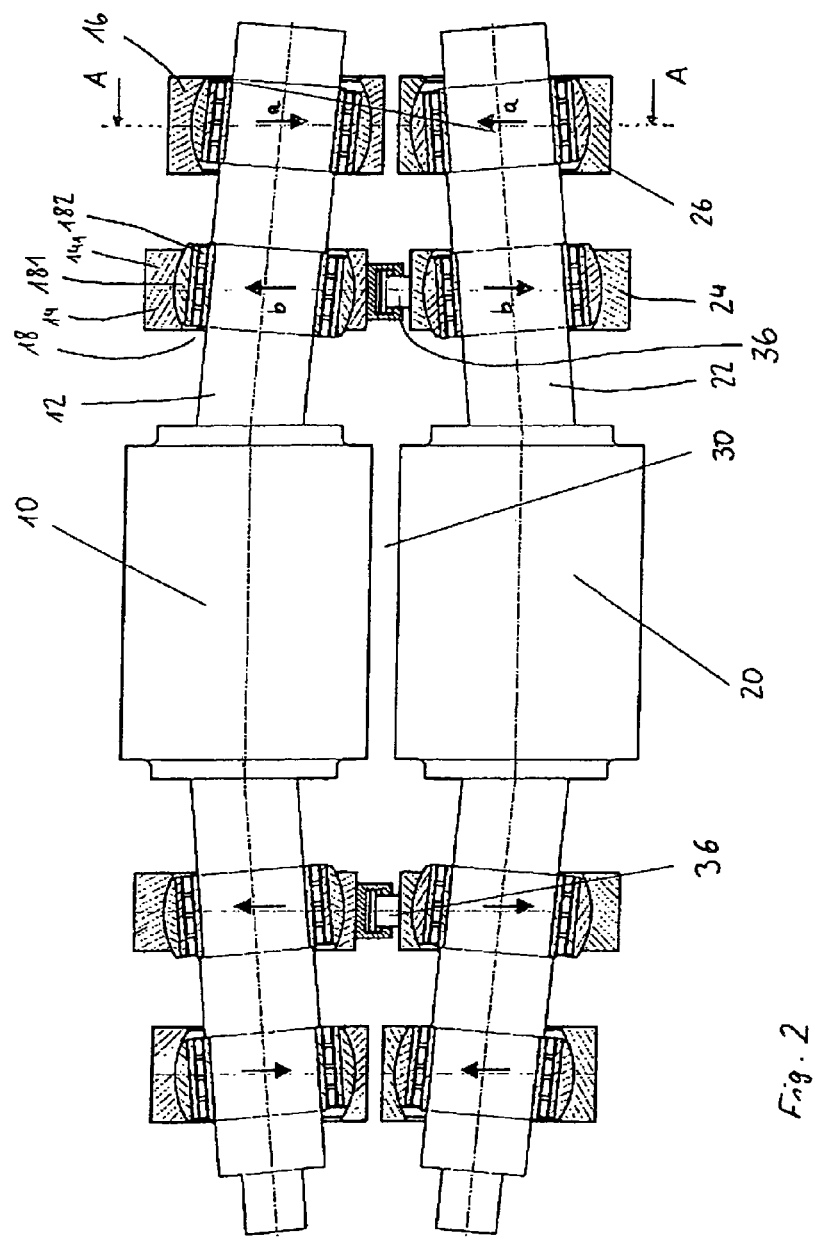
FIG. 2 is a sectional representation of the roll bearing and the roll adjustment.

FIG. 2 shows a sectional representation of the roll bearing and the roll adjustment according to FIG. 1. Each bearing block 18 includes a bearing shell 181 in which a number of bearings 182 is arranged, bearing shell 18 being pivoted about an axis. By this kind of bearing, roll journals 12, 22 are spherically mounted.

When starting the installment, firstly an orientation of the roll bearings is necessary in order to avoid an edge load of the roll bearings. This is achieved by pulsing the roll adjustment. The inner bearing blocks (14) are alternately frequented with the nip adjustment and with a small overload. This is done so that friction between bearing shell 181 and base 141 for example of bearing jewel 14 is reduced and elements orient themselves perpendicular to the respective force flow line a or b according to their symmetrical constructions.

Appropriate measures for bearing a bearing block within a clamping latch, e.g. 16, are made.

Regulation of roll nip 30 is now achieved by two separate steps. Initially, clamping latch 16 of upper roll 10 and clamping latch 26 of lower roll 20 are moved towards another in direction of arrows a, so that a roll nip 30 is adjusted according to a predetermined thrust and a predetermined linear load.

Figure 3:
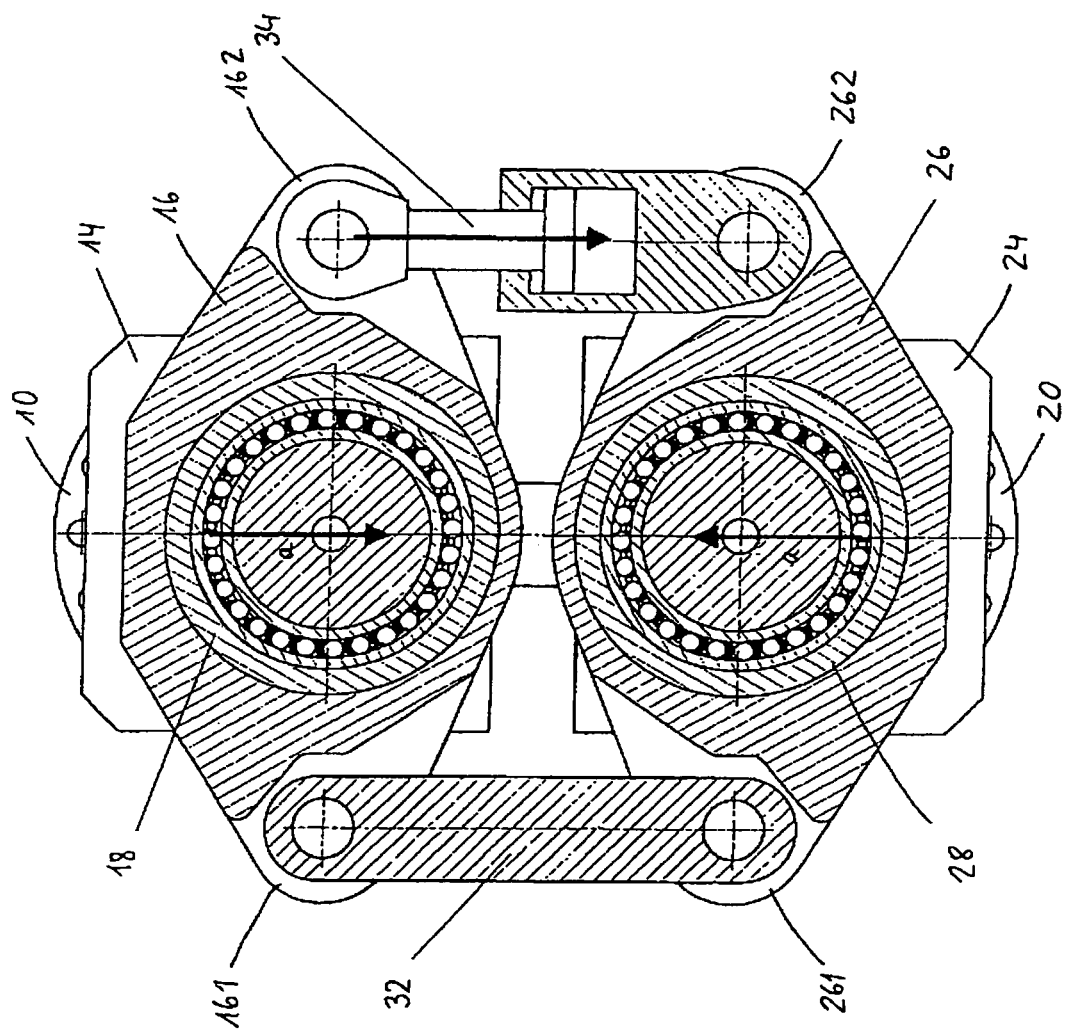
FIG. 3 is a sectional representation taken along line A-A of FIG. 2.

FIG. 3 shows details in a sectional view taken along line A-A of FIG. 2. Clamping latch 16 of upper roll 10 comprises a first lever arm 161 and a second lever arm 162 which are formed on both sides of bearing block 18. Corresponding thereto, clamping latch 26 of lower roll 20 comprises a first lever arm 261 and a second lever arm 262 which are formed on both sides of bearing block 28. First lever arm 161 of first clamping latch 16 is rigidly connected with first lever arm 261 of second clamping latch 26 via a tension rod 32. Second lever arm 162 of clamping latch 16 is connected with second lever arm 162 of clamping latch 26 via a first actuating element 34 which in the represented embodiment is configured as a hydraulic cylinder. When, by an appropriate drive, the piston is moved into the cylinder in direction of the arrow, clamping latch 16 and clamping latch 26 are moved towards one another in direction of arrows a, together with upper roll 10 and lower roll 20, so that a roll nip is adjusted as required.

Back to FIG. 2 it is now explained how counter-bending forces are produced. To do this, a second actuating element 36 which is again configured as a hydraulic cylinder in the present embodiment, is provided between a bearing jewel 14 of the upper roll and a bearing jewel 24 of lower roll 20. Second actuating element 36 provides that bearing jewels 14, 24 are maintained in a relative rest position which is defined by a specified densification of a material web passing through roll nip 30.

In this embodiment of the roll arrangement according to the present invention, all actuating elements are hydraulic ones. Principally, also a mechanical compensation is conceivable which, however, cannot be realized due to the high occurring line tensions in a magnitude of 6 t/cm. Using rolls and cams, surface pressure would be so high that enormous wear must be expected. Moreover, the required roll nip position of 1μ cannot be maintained thereby. Hydraulics is very precise and can operate very quickly. Hydraulic drives of this type are known from aircraft construction. Conventional SPS controls would not work since they are too slow. Accordingly, in the roll arrangement according to the present invention, control is made directly with the aid of a computer program.

The roll arrangement according to the present invention is mounted in a calendar stool. Cyclomotors are used for driving the rolls which are characterized by a high backlash-free design. In a use as a finishing machine, it is generally provided that the upper roll has a greater peripheral speed than the lower roll.

All ducts conveying hydraulic fluids are equipped with a large cross-sectional area in order to keep the inner friction as small as possible. If required, pressure compensation by means of cylinder is provided for.

Depending on the application, the rolls are highly tempered, hardened, hard-chrome plated and high-gloss polished, even a carbide coating may be appropriate.

The features of the invention disclosed in the above description, in the drawings and in the claims may be both individually and in any combination the material for realizing the invention.

REFERENCE NUMERAL LIST 10 upper roll
12 roll journal
14 bearing jewel
16 clamping latch
18 bearing block
20 lower roll
22 roller journal
24 bearing jewel
26 clamping latch
28 bearing block
30 roll nip
32 tension rod
34 first actuating element
36 second actuating element
141 base
161 first lever arm
162 second lever arm
181 bearing shell
182 bearing
261 first lever arm
262 second lever arm

The invention claimed is:

1. A roll arrangement having a device for regulating the roll nip, comprising:
    a roll pair which consists of an upper roll and a lower roll, between which a roll nip is formed, wherein each roll is provided with two roll journals which lie axially and diametrically opposite one another;
    at least two bearing blocks for each roll journal, wherein one or more bearings are received in a bearing block; and
    a pair of bearing blocks, the pair comprising one of the at least two bearing blocks for each roll journal each of the pair lies on the outside on the respective roll journal, and each of the pair is in a respective clamping latch, each clamping latch having a first lever arm and a second lever arm,
    wherein the first lever arm of the clamping latch of the upper roll and the first lever arm of the clamping latch of the lower roll are connected rigidly to one another; the second lever arm of the respective clamping latch of the upper roll and the second lever arm of the respective clamping latch of the lower roll are connected to one another via a first actuating element;
    mutually corresponding bearing jewels are provided for each of the bearing blocks; wherein bearing jewels of the upper roll and the lower roll and clamping latches of the upper roll and the lower roll lie opposite one another, and the bearing jewels of the upper roll and the lower roll are connected to one another by a second actuating element; and
    a controller which acts on the first and the second actuating element.

2. The roll arrangement of claim 1, wherein the first actuating element and/or the second actuating element are embodied as a hydraulically operating actuating element, a pneumatically operating element or a mechanically operating element which is electrically driven.

3. The roll arrangement of claim 1, wherein one of the at least two bearing blocks comprises a pivoted bearing housing in which the bearings accommodated therein are arranged pivotally about a common axis.

4. A method for regulating the roll nip in a roll arrangement of claim 1, wherein the method comprises the following steps:
    a) moving the first actuating elements to adjust the roll nip according to a predetermined thrust and a predetermined linear load; and
    b) moving the second actuating elements to maintain the bearing jewels of the upper roll and the lower roll in a relative rest position which is defined by specified densification of a material web passing the roll nip.

* * * * *